United States Patent [19]
Peters

[11] Patent Number: 5,330,084
[45] Date of Patent: Jul. 19, 1994

[54] BICYCLE RACK APPARATUS

[76] Inventor: Mark R. Peters, P.O. Box 9387, 16615 Glenshire Dr., Truckee, Calif. 96162

[21] Appl. No.: 44,765

[22] Filed: Apr. 12, 1993

[51] Int. Cl.⁵ .............................................. B60R 9/10
[52] U.S. Cl. ..................... 224/42.45 R; 224/42.03 B; 248/291; 211/171; 403/104; 403/106
[58] Field of Search ...................... 224/42.03 B, 42.08, 224/42.45 R, 42.44, 42.07, 324, 315, 42.01; 248/291, 185; 211/17, 18, 22, 168, 171, 100, 5; 403/104, 105, 106, 107, 108, 83, 84

[56] References Cited

U.S. PATENT DOCUMENTS

| | | | |
|---|---|---|---|
| 3,357,670 | 12/1967 | Larson | 211/100 X |
| 4,394,948 | 7/1983 | Graber | 224/42.03 B |
| 4,991,810 | 2/1991 | Andrus et al. | 224/42.45 R X |
| 5,004,133 | 4/1991 | Wyers | 224/42.45 R |
| 5,067,641 | 11/1991 | Johnson et al. | 224/42.03 B |
| 5,096,102 | 3/1992 | Tolson | 224/42.45 R |
| 5,190,195 | 3/1993 | Fullhart et al. | 224/42.45 R X |

Primary Examiner—Glenn T. Barrett
Attorney, Agent, or Firm—E. Michael Combs

[57] ABSTRACT

A rack structure mounted to a vehicular hitch socket is provided to include a first support tube received within the hitch socket, with a second support tube pivotally mounted in a selective latching arrangement relative to the first support tube, with a third support tube fixedly and orthogonally mounted to the second support tube containing a plurality of hook legs thereon for engaging a bicycle frame for support of the bicycle relative to the rack apparatus.

5 Claims, 4 Drawing Sheets

BICYCLE RACK APPARATUS

BACKGROUND OF THE INVENTION

1. Field of the Invention

The field of invention relates to bicycle rack structure, and more particularly pertains to a new and improved bicycle rack apparatus wherein the same is arranged for mounting to a hitch tube of an associated vehicle.

2. Description of the Prior Art

Bicycle rack structure of various types have been employed in the prior art for the ease of transport of bicycles relative to an associated vehicle, wherein such structure is indicated in U.S. Pat. No. 5,067,641 to Johnson having a support tube structure arranged for reception within a socket portion of an associated motor vehicle.

Further examples are indicated in U.S. Pat. Nos. 4,128,195; 4,461,410; and 4,050,616.

The instant invention attempts to overcome deficiencies of the prior art by providing for a support rack structure arranged for ease of pivoting relative to a rear door portion of an associated motor vehicle for ease of access to the motor vehicle without removal of the bicycle structure relative to the rack apparatus and in this respect, the present invention substantially fulfills this need.

SUMMARY OF THE INVENTION

In view of the foregoing disadvantages inherent in the known types of bicycle rack apparatus now present in the prior art, the present invention provides a bicycle rack apparatus wherein the same is arranged for the pivoted mounting of a bicycle rack relative to an associated support vehicle. As such, the general purpose of the present invention, which will be described subsequently in greater detail, is to provide a new and improved bicycle rack apparatus which has all the advantages of the prior art bicycle rack apparatus and none of the disadvantages.

To attain this, the present invention provides a rack structure mounted to a vehicular hitch socket, to include a first support tube received within the hitch socket, with a second support tube pivotally mounted in a selective latching arrangement relative to the first support tube, with a third support tube fixedly and orthogonally mounted to the second support tube containing a plurality of hook legs thereon for engaging a bicycle frame for support of the bicycle relative to the rack apparatus.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bicycle rack apparatus which has all the advantages of the prior art bicycle rack apparatus and none of the disadvantages.

It is another object of the present invention to provide a new and improved bicycle rack apparatus which may be easily and efficiently manufactured and marketed.

It is a further object of the present invention to provide a new and improved bicycle rack apparatus which is of a durable and reliable construction.

An even further object of the present invention is to provide a new and improved bicycle rack apparatus which is susceptible of a low cost of manufacture with regard to both materials and labor, and which accordingly is then susceptible of low prices of sale to the consuming public, thereby making such bicycle rack apparatus economically available to the buying public.

Still yet another object of the present invention is to provide a new and improved bicycle rack apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
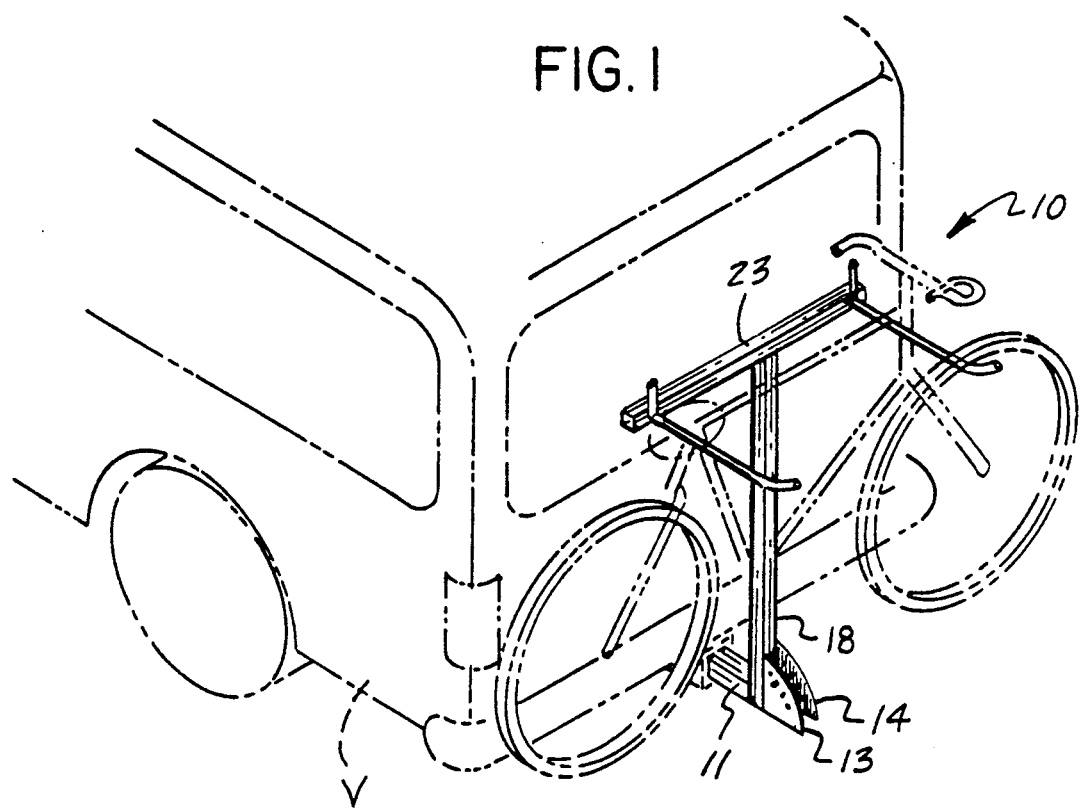
FIG. 1 is an isometric illustration of the invention.

With reference now to the drawings, and in particular to FIGS. 1 to 8 thereof, a new and improved bicycle rack apparatus embodying the principles and concepts of the present invention and generally designated by the reference numeral 10 will be described.

Figure 3:
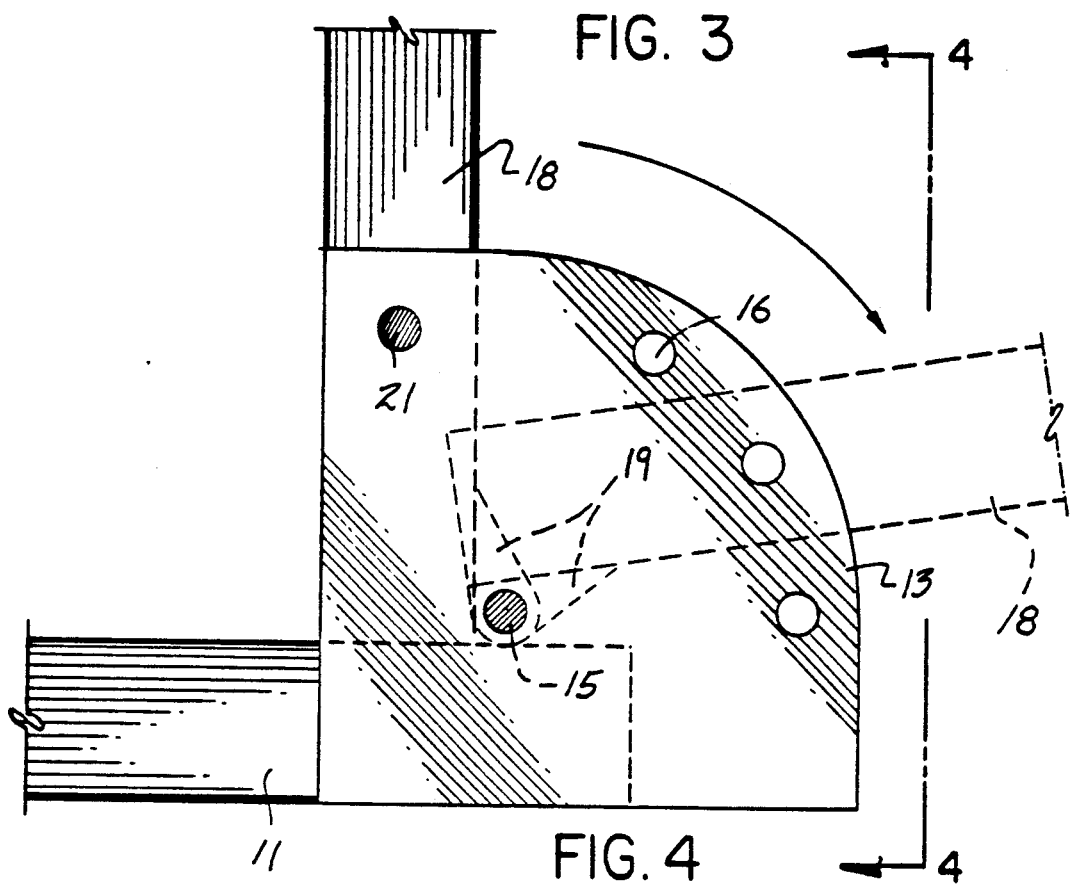
FIG. 3 is an orthographic side view of the pivotal mounting of the second support tube relative to the first support tube.
Figure 4:
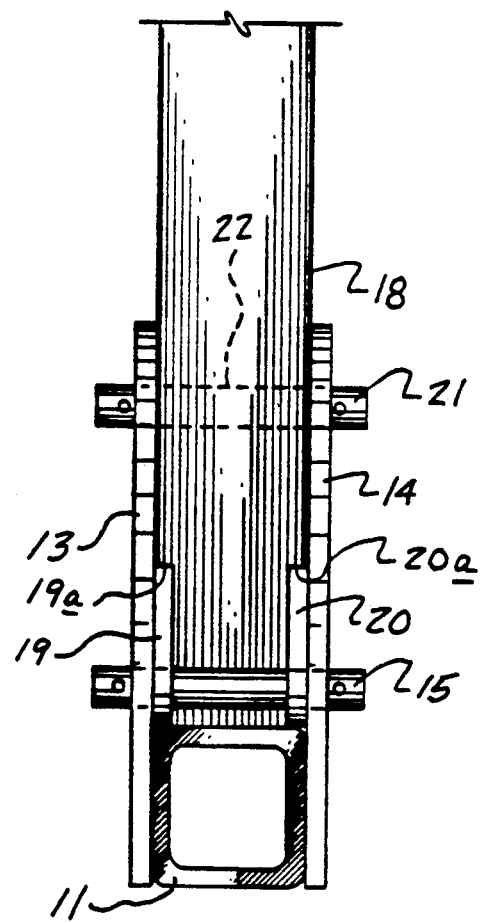
FIG. 4 is an orthographic view, taken along the lines 4—4 of FIG. 3 in the direction indicated by the arrows.
Figure 5:
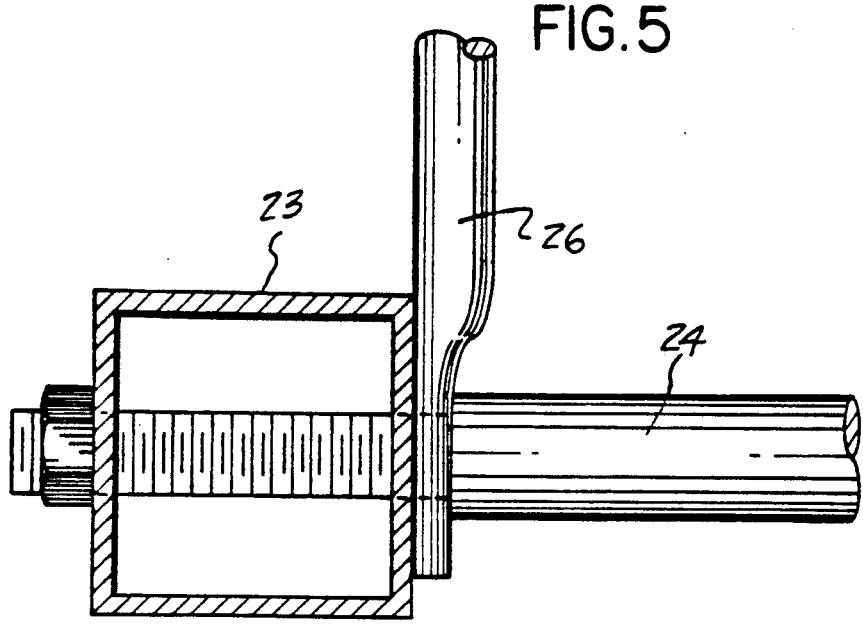
FIG. 5 is an orthographic view of the hook leg structure mounted to the associated third support tube.

More specifically, the bicycle rack apparatus 10 of the instant invention essentially comprises a first support tube 11, having a first support tube aperture 12 arranged for reception within a hitch socket of an associated motor vehicle "V" to receive a hitch socket lock pin. Respective first and second guide plates 13 and 14 are mounted to the first support tube 11 extending beyond a forwardmost end of the first support tube, with a pivot axle 15 orthogonally directed through the first and second guide plates 13 and 14, with respective first and second semi-cylindrical arrays of first and second bores 16 and 17 directed and adjacent an outermost periphery of the respective first and second guide plates 13 and 14 concentric relative to the pivot axle 15. A second support tube 18 is provided, having first and second triangular link plates 19 and 20 pivotally mounted about the pivot axle 15 and integrally secured to the second support tube 18 at its lowermost end, with the first and second triangular link plates 19 and 20 orthogonally oriented relative to the second support tube, with first and second link plate apex tips 19a and 20a respectively spaced from the pivot axle 15 and fixedly mounted in contiguous communication to the second support tube permitting pivoting of the second support tube relative to the first support tube, wherein the first and second triangular link plates 19 and 20 are arranged for engagement with the first support tube positioned below the first and second triangular link plates 19 and 20 to maintain the second support tube in an upwardly canted orientation relative to the first support tube when the second support tube is oriented in a lowered orientation relative to the first support tube, such as in a manner as indicated in FIG. 3.

Figure 2:
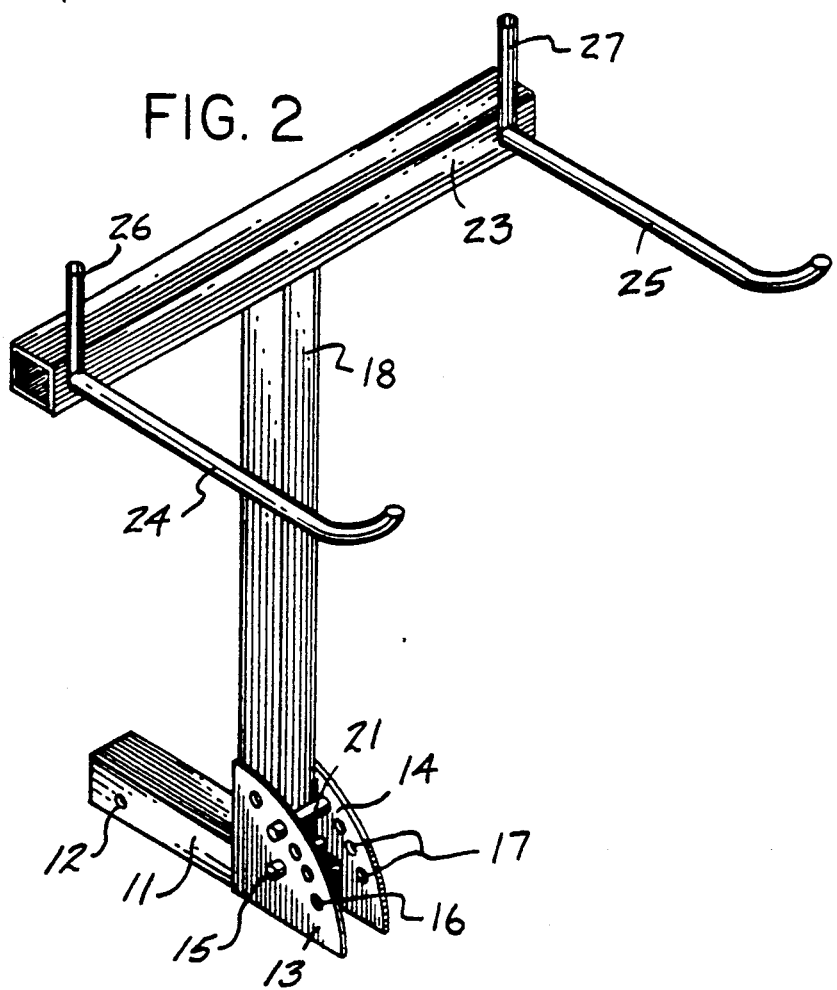
FIG. 2 is an enlarged isometric illustration of the invention.
Figure 6:
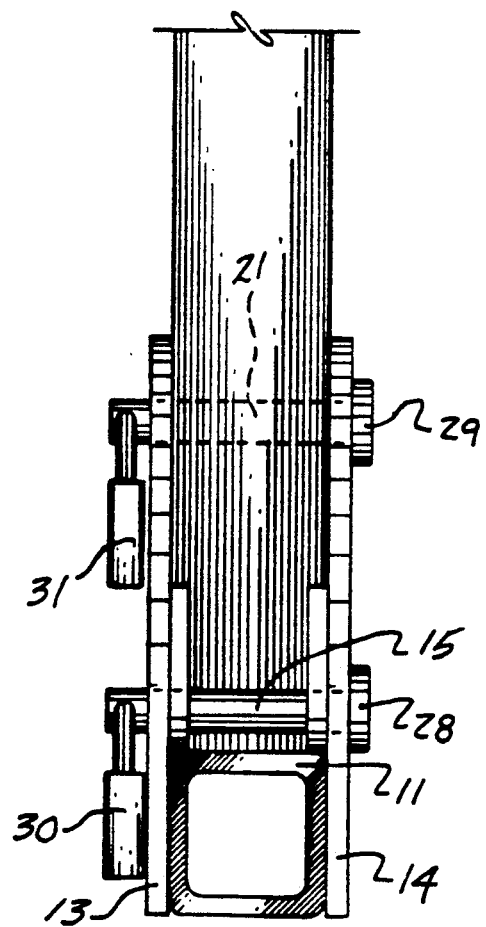
FIG. 6 is an orthographic view of the second support tube relative to the first support tube in a latched configuration.

A lock axle 21 is provided in a spaced parallel relationship relative to the pivot axle 15, with the lock axle arranged for reception through a lock axle second tube bore 22 directed through the support tube, that in turn is concentric relative to the pivot axle 15 in association with the first and second bores 16 and 17. The lock axle 21 is arranged for reception through one of the first and second bores, as well as through the lock axle second tube bore 22, or alternatively through aligned first and second bores 16 and 17, in a manner as indicated in FIG. 2 for example. A third support tube 23 is fixedly and orthogonally mounted to an uppermost distal end of the second support tube, with the third support tube 23 medially intersected by the second support tube. First and second hook legs 24 and 25 are orthogonally mounted to the third support tube 23 projecting exteriorly of the third support tube terminating in upwardly canted hook leg end portions for accommodating a bicycle framework, in a manner as indicated in FIG. 1. The respective first and second hook legs 24 and 25 include respective first and second abutment legs 26 and 27 fixedly and orthogonally mounted to the first and second hook legs 24 and 25 at their intersection with the respective third support tube 23 to provide for an abutment surface relative to the bicycle member. The respective pivot and lock axles 15 and 21 respectively include respective pivot and lock axle head plates 28 and 29 positioned exteriorly of the second guide plate 13 and 14, wherein pivot and lock axle lock members 30 and 31 are mounted to the pivot and lock axles respectively exteriorly of the first and second guide plates 13 and 14, in a manner as indicated in FIG. 6, to provide for fixed securement of the second support tube relative to the first support tube, wherein removal of the pivot and lock axle lock members 30 and 31 permit removal of the pivot and lock axles 15 and 21 respectively relative to the second support tube permitting removal of the second support tube relative to the first support tube to permit ease of disassembly of the rack apparatus.

Figure 7:
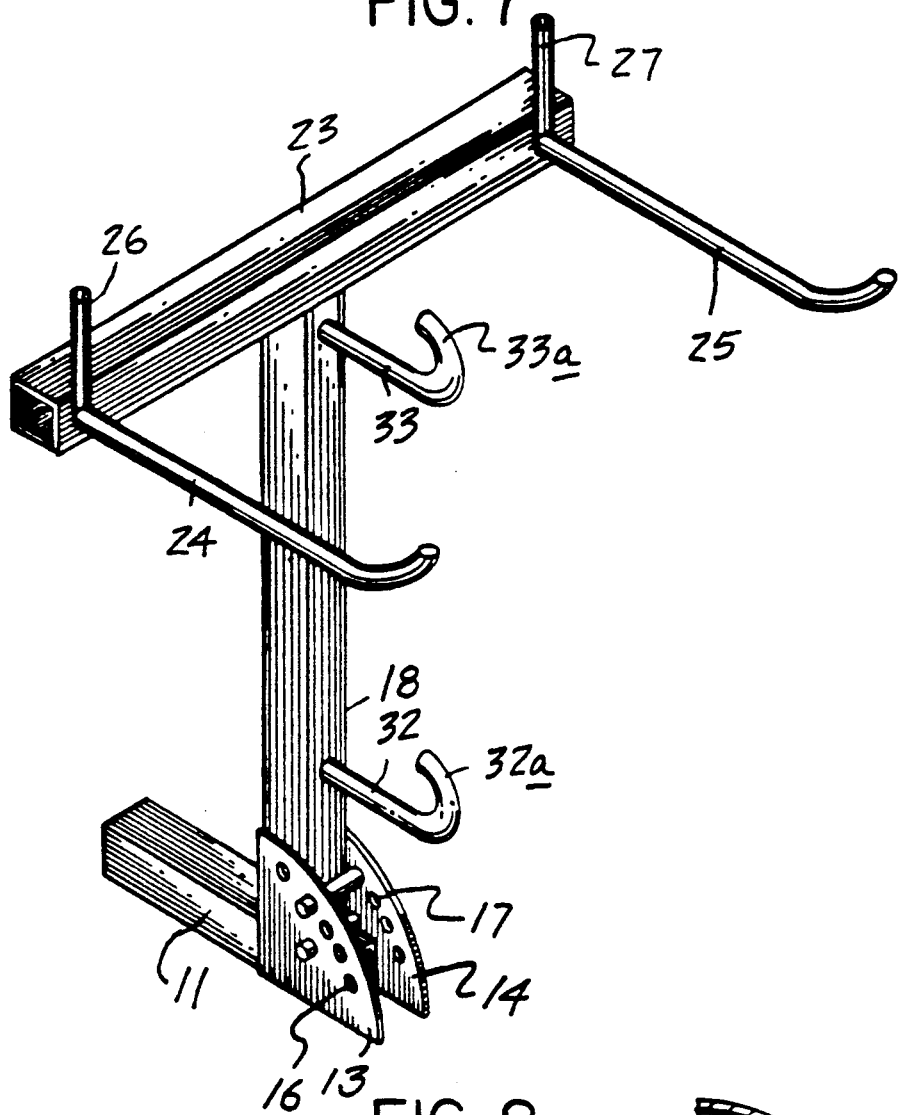
FIG. 7 is an isometric illustration of the invention further employing latch hooks to the second support tube.
Figure 8:
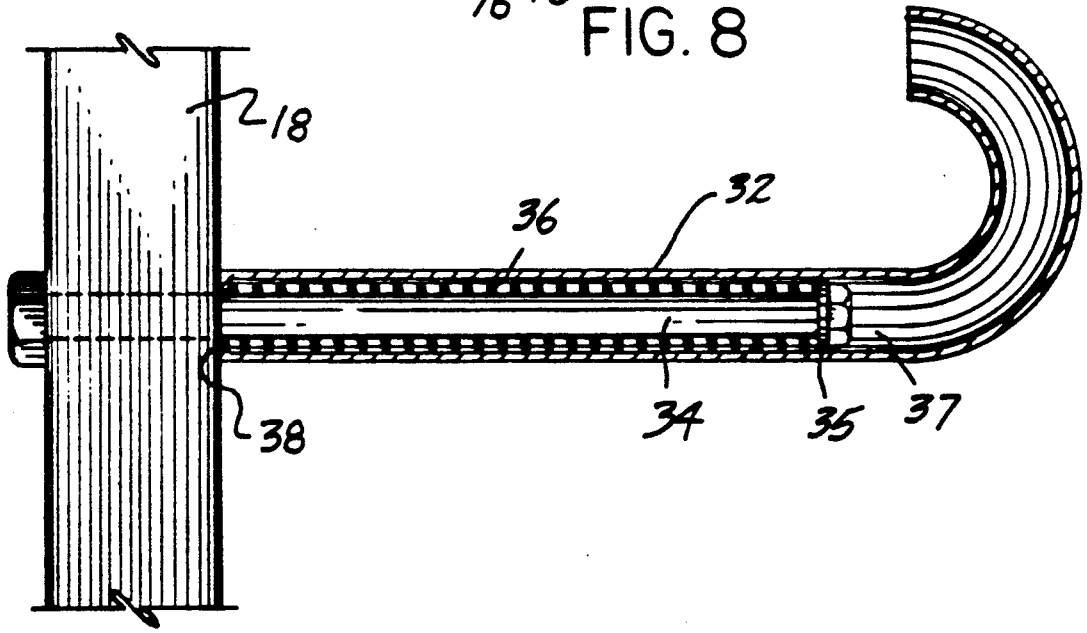
FIG. 8 is an orthographic cross-sectional illustration of one of the latch hooks in a typical mounting relative to the second support tube.

The FIG. 7 indicates the use of respective first and second latch hooks 32 and 33 orthogonally mounted to the second support tube intermediate the third support tube and the first support tube, with the first and second latch hooks 32 and 33 having respective first and second latch hook U-shaped second distal ends 32a and 33a respectively spaced from latch hook first distal ends 38, such as indicated in FIG. 8, that include an annular support flange, wherein the latch hooks 32 and 33 each include a latch hook cavity 37 receiving a mounting rod 34 reciprocatably therethrough in a coaxially aligned relationship, wherein the mounting rod includes a mounting rod head 35 capturing a mounting rod spring 36 between the mounting rod head 35 and the annular support flange to permit biased communication of the latch hooks towards the second support tube to assist in securement of the associated bicycle relative to the second support tube minimizing vibration during the transport of the bicycle relative to the second support tube and associated rack apparatus 10.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bicycle rack apparatus, comprising, a first support tube, having a first support tube first end spaced from a first support tube second end, with the first support tube including first and second guide plates mounted to the first support tube in a spaced parallel relationship extending beyond the first support tube second end, with the first guide plate including a semi-annular array of first bores, with the second guide plate including a semi-annular array of second bores, and a pivot axle pivotally mounted through and in an orthogonal relationship relative to the first guide plate and the second guide plate, with the pivot axle being spaced from the semi-annular arrays of first bores and second bores, and a second support tube, having a second support tube first end and a second support tube second end, the second support tube including respective first and second triangular link plates fixedly and orthogonally mounted to the second support tube and located intermediate the first guide plate and the second guide plate, with the first triangular link plate including a first apex, the second triangular link plate including a second apex, with the first apex and the second apex positioned in contiguous communication with the second support tube with the pivot axle directed through the first link plate and the second link plate, with the first link plate and the second link plate being arranged for abutment with the first support tube adjacent the first support tube second end upon pivoting of the second support tube about the first support tube, and means for supporting a bicycle.

2. An apparatus as set forth in claim 1 including a lock axle arranged for reception through one of the said first bores and one of the second bores, with the second support tube having a second support tube lock bore, with the lock axle further being arranged for reception through the second support tube lock bore.

3. An apparatus as set forth in claim 2 wherein the means for supporting a bicycle includes a third support tube fixedly and orthogonally mounted to the second support tube second end, with the third support tube having a first hook leg and a second hook leg arranged in a parallel relationship relative to one another and fixedly and orthogonally mounted to the third support tube projecting from the third support tube, and a first hook leg having a first abutment leg orthogonally oriented relative to the first hook leg in abutment with the third support tube, and the second hook leg having a second abutment leg fixedly and orthogonally mounted to the second hook leg in abutment with the third support tube.

4. An apparatus as set forth in claim 3 wherein the pivot axle includes a pivot axle head positioned exteriorly of the first guide plate, and the lock axle includes a lock axle head positioned exteriorly of the first guide plate, and the pivot axle including a pivot axle lock member arranged for reception through the pivot axle exteriorly of the first guide plate, and the lock axle including a lock axle lock member arranged for reception through the lock axle exteriorly of the first guide plate such that removal of the lock axle member and the pivot axle lock member permit removal of the pivot axle and the lock axle relative to the first guide plate and the second guide plate respectively.

5. An apparatus as set forth in claim 4 wherein the second support tube includes at least one latch hook, wherein the at least one latch hook is fixedly and orthogonally mounted to the second support tube intermediate the second support tube first end and the second support tube second end, wherein the latch hook includes a U-shaped distal end spaced from the second support tube, and the latch hook having a mounting rod fixedly and orthogonally directed through the second support tube, and the latch hook having a latch hook first end, including an annular support flange positioned in surrounding relationship relative to the mounting rod, the mounting rod including a mounting rod head, and the latch hook having a latch hook cavity coaxially aligned with the mounting rod, with the mounting rod including a spring member wound about the mounting rod interposed between the mounting rod head and the annular support flange to maintain the mounting rod in biased communication relative to the second support tube.

* * * * *